(12) United States Patent
Stanwood et al.

(10) Patent No.: US 7,486,639 B2
(45) Date of Patent: **\*Feb. 3, 2009**

(54) ADAPTIVE TIME DIVISION DUPLEXING METHOD AND APPARATUS FOR DYNAMIC BANDWIDTH ALLOCATION WITHIN A WIRELESS COMMUNICATION SYSTEM

(75) Inventors: Kenneth L. Stanwood, Cardiff by the Sea, CA (US); James F. Mollenauer, Newton, MA (US); Israel Jay Klein, San Diego, CA (US); Sheldon L. Gilbert, San Diego, CA (US); Rami Hadar, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 662 days.

This patent is subject to a terminal disclaimer.

(21) Appl. No.: 11/114,662

(22) Filed: Apr. 26, 2005

(65) Prior Publication Data
US 2005/0243745 A1    Nov. 3, 2005

Related U.S. Application Data

(63) Continuation of application No. 09/316,518, filed on May 21, 1999, now Pat. No. 6,925,068.

(51) Int. Cl.
*H04G 7/00* (2006.01)
(52) U.S. Cl. ........................ 370/329; 370/437
(58) Field of Classification Search .................. None
See application file for complete search history.

(56) References Cited

U.S. PATENT DOCUMENTS 5,297,144 A    3/1994   Gilbert et al.

(Continued)

FOREIGN PATENT DOCUMENTS

EP    0 507 384 A2    10/1992

(Continued)

OTHER PUBLICATIONS

Qiu, et al., "Dynamic Reservation Multiple Access (DRMA): A New Multiple Access Scheme for Personal Communication System (PCS)," Wireless Networks, ACM, US, vol. 2, No. 2, Jun. 1, 1996, pp. 117-128.

(Continued)

*Primary Examiner*—Anh-Vu H Ly
(74) *Attorney, Agent, or Firm*—Dov Rosenfeld; Inventek

(57) ABSTRACT

An adaptive time division duplexing (ATDD) method and apparatus for duplexing transmissions on a communication link in wireless communication systems. Communication link efficient is enhanced by dynamically adapting to the uplink and downlink bandwidth requirements of the communication channels. Time slots are flexibly and dynamically allocated for uplink or downlink transmissions depending upon the bandwidth needs of a channel. Communication link bandwidth requirements are continuously monitored using sets of predetermined bandwidth requirement parameters. Communication channels are configured to have either symmetric or asymmetric uplink/downlink bandwidths depending upon the needs of the channel. Channel bandwidth asymmetry can be configured alternatively in favor of the uplink transmissions (i.e., more time slots are allocated for uplink transmissions than for downlink transmissions) or in favor of the downlink transmissions (i.e., more time slots are allocated for downlink transmissions than for uplink transmissions). A myriad of time slot allocation schemes are possible. One simplified time slot allocation scheme uses a "frame-based" approach. A preferred channel bandwidth analysis technique is disclosed which monitors and updates bandwidth requirement parameters associated with communication sessions, base stations and cell cluster controllers. In accordance with this technique, a communication session is preferably assigned both an "initial" and an "actual" set of bandwidth parameters.

10 Claims, 6 Drawing Sheets

U.S. PATENT DOCUMENTS

| | | |
|---|---|---|
| 5,444,698 A | 8/1995 | Kito |
| 5,506,848 A | 4/1996 | Drakopoulos et al. |
| 5,594,720 A | 1/1997 | Papadopoulos et al. |
| 5,615,212 A | 3/1997 | Ruszczyk et al. |
| 5,638,371 A | 6/1997 | Raychaudhuri et al. |
| 5,638,374 A | 6/1997 | Heath |
| 5,644,576 A * | 7/1997 | Bauchot et al. ............. 370/437 |
| 5,675,573 A | 10/1997 | Karol et al. |
| 5,677,909 A | 10/1997 | Heide |
| 5,710,762 A * | 1/1998 | Petranovich ................ 370/280 |
| 5,729,531 A | 3/1998 | Raith et al. |
| 5,751,708 A | 5/1998 | Eng et al. |
| 5,898,925 A * | 4/1999 | Honkasalo et al. .......... 370/337 |
| 5,956,330 A | 9/1999 | Kerns |
| 5,956,642 A | 9/1999 | Larsson et al. |
| 6,005,857 A * | 12/1999 | Honkasalo et al. .......... 370/337 |
| 6,016,311 A | 1/2000 | Gilbert et al. |
| 6,047,189 A | 4/2000 | Yun et al. |
| 6,052,594 A | 4/2000 | Chuang et al. |
| 6,094,421 A | 7/2000 | Scott |
| 6,925,068 B1 * | 8/2005 | Stanwood et al. ........... 370/329 |

FOREIGN PATENT DOCUMENTS

| | | |
|---|---|---|
| EP | 0 845 916 A2 | 6/1998 |
| EP | 0 891 060 A2 | 1/1999 |
| GB | 2 320 162 A | 6/1998 |
| WO | WO 92/22162 | 12/1992 |

OTHER PUBLICATIONS

Kim, et al., "PRMA/DA: A New Media Access Control Protocol for Wireless ATM," 1996 IEEE International Conference On Communications (ICC). Converging Technologies For Tomorrow's Applications, New York, IEEE, US, vol. 1, Jun. 23, 1996, pp. 240-244.

* cited by examiner

ADAPTIVE TIME DIVISION DUPLEXING METHOD AND APPARATUS FOR DYNAMIC BANDWIDTH ALLOCATION WITHIN A WIRELESS COMMUNICATION SYSTEM

RELATED APPLICATIONS

This is a continuation of U.S. patent application Ser. No. 09/316,518, filed May 21, 1999, now U.S, Pat. No. 6,925,068 which claimed priority to U.S. patent application Ser. No. 08/974,376, filed Nov. 19, 1997, titled "AN ADAPTIVE TIME DIVISION DUPLEXING METHOD AND APPARATUS FOR DYNAMIC BANDWIDTH ALLOCATION WITHIN A WIRELESS COMMUNICATION SYSTEM," now U.S. Pat. No. 6,016,311, all of which are hereby incorporated by reference.

BACKGROUND OF THE INVENTION

1. Field of the Invention

This invention relates to wireless communication systems, and more particularly to wireless point to multi-point voice, data and video ("broadband") communication systems.

2. Description of Related Art

A wireless communication system facilitates two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit user with the fixed network infrastructure (usually a wired-line system). In the wireless systems using multiple access schemes, frames of time are the basic transmission unit. Each frame is divided into a plurality of slots of time. Some time slots are used for control purposes and some time slots are used for information transfer. Information is typically transmitted during time slots in the frame where the time slots are assigned to a specific subscriber unit. Subscriber units typically communicate with the base station using a "duplexing" scheme which allows for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing (TDD) or frequency division duplexing (FDD) methods to facilitate the exchange of information between the base station and the subscriber units. Both the TDD and FDD duplexing schemes are well known in the art.

In FDD systems, duplexing of transmissions between a base station and its subscriber units is performed in the frequency domain. Different sets of frequencies are allocated for uplink and downlink transmissions. For example, two well-known FDD systems are the pan-European GSM system (also known as Global System for Mobile Communication) and the North American IS-54 and IS-136 wireless communication systems. Both of these systems use a TDMA (time-division multiple access) with an FDD duplexing approach. See, e.g., D. J. Goodman, "Second Generation Wireless Information Networks," IEEE Trans. Veh. Tech., VT-40, No. 2, pp. 366-374, May 1991. The IS-54 air interface uses TDMA/FDD technology with three channels per 30-kHz AMPS carrier. The GSM air interface is characterized by an eight-order TDMA scheme with FDD. The available frequency band in Europe is 2*25 MHz, with radio channel spacing of 200 kHz. In both wireless systems, a base station transmits information to a plurality of subscriber units during a given first set of time slots and using a pre-determined set of downlink frequencies. Subscriber units transmit information to the base station using a pre-determined set of uplink frequencies. The uplink and downlink frequencies are offset or spaced in the frequency domain by a known spacing value. The duplex spacing in both the GSM and IS-54 systems is 45 MHz (i.e., the downlink frequency of a given subscriber unit is separated by 45 MHz from the uplink frequency of that subscriber unit).

Disadvantageously, FDD systems require frequency separation between the uplink and downlink frequency bands. The bandwidth allocation schemes needed to provide a given service are made more complex and therefore more costly than those used by TDD systems. FDD systems also disadvantageously require that a duplexor be provided with the subscriber unit antenna in order to separate the transmission and reception signals from each other at the antenna. Consequently, the complexity and costs associated with the subscriber unit are increased. Although FDD systems are effective in reducing interference between the uplink and downlink transmissions, FDD systems have limited flexibility and limited available frequency spectrum which is especially disadvantageous in broadband wireless communication systems. FDD systems allocate an equal or symmetrical bandwidth for both the uplink and downlink transmissions. However, many broadband services have asymmetrical bandwidth requirements (i.e., the percentage of downlink transmissions far outnumber the percentage of uplink transmissions, or vice versa). An FDD approach therefore results in under-utilized spectrum when used to duplex transmissions in a broadband communication system. The FDD approach also disadvantageously requires that adequate frequency spectrum be available for both uplink and downlink transmissions when converting to another frequency band for a related application.

In TDD systems, duplexing of transmissions between a base station and its subscriber units is performed in the time domain. A selected subscriber unit typically communicates with a selected base station using a specific pre-defined radio frequency. The channel is time-divided into repetitive time periods or time "slots" which are employed for uplink and downlink transmissions. In contrast to FDD systems, frequency allocation or frequency reuse patterns are simplified because there is no requirement of frequency separation between the uplink and downlink transmissions. Both the uplink and downlink transmissions occur during different pre-determined time slots using the identical radio frequency. However, the subscriber units in the TDD systems disadvantageously must accommodate an increased instantaneous bit rate which is required due to the time sharing of the channel. The modems in the subscriber units of TDD systems are typically active only one-half of the time. As a consequence, in order to achieve the same average bit-rates, the typical TDD modem is more complex than it would be in a system which would allow the modems to always remain active. Therefore, the TDD modems are more complex and therefore more costly than necessary to achieve a given average bit rate.

One well-known application for the TDD approach is found in digital cordless telephone (DCT) systems. Transmission standards or specifications have been developed in both Japan and Europe for use in designing DCT systems. Each of the transmission standards use a TDD technique for two-way communication. The Japanese DCT transmission standard specifies the use of a plurality of individual carrier signals having a frequency separation of 300 kHz within an overall system bandwidth of about 23 MHz between approximately 1,895 MHz to 1,918 MHz. Each carrier signal must support four channels in a TDMA format employing TDD for two-way communication. In particular, for each frame of time (5 ms) there are four transmit time slots (one for each channel) and four receive time slots (one for each channel). Each slot is approximately 625 micro-seconds duration with a guard time of approximately 30 micro-seconds provided within each slot.

By contrast, the European DCT system, or Digital European Cordless Telecommunication (DECT) system specifies a series of carriers spaced 1,728 MHz apart within an overall bandwidth of approximately 17.28 MHz. The DECT standard provides a network architecture in addition to an air interface physical specification and protocols. Ten carrier frequencies are employed in conjunction with twenty-four time slots per carrier and ten carriers per 20 MHz of frequency spectrum. A TDD approach is used for transmission between the cordless telephone and the base station. A transmission channel is formed via a combination of a time slots and frequencies. Transmissions occur during a ten millisecond time frame wherein each frame comprises twenty-four time slots. Twelve of the time slots are used for transmissions from the base station to the handset (downlink transmissions) while twelve are used for transmissions from the handset to the base station (uplink transmissions).

Because the DECT channels allocate an equal amount of time (and thus bandwidth) for both the uplink and downlink transmissions, the DECT TDD duplexing scheme is said to be "symmetrical" in nature. A symmetrical duplexing system is sufficient for systems (such as the DECT system) where, on the average, an equal amount of bandwidth is required for reception and transmission of information. However, symmetrical duplexing systems are inefficient in communication systems offering services requiring an asymmetric information exchange between the base station and subscriber stations. This is especially true in wireless communication systems offering wideband or "broadband" services such as voice, data and video services.

In wireless communication networks offering broadband services there is no guarantee that the uplink and downlink transmissions will have equal or symmetrical bandwidth requirements. In fact, in many scenarios currently being contemplated, it is likely that the bandwidth requirements will be unequal and asymmetrical. There are several factors driving this observation. First, the ratio of uplink and downlink bandwidth requirements is somewhat dependent upon the service provided over the link. For example, a typical telephony voice service ("POTS"-type service) has a largely symmetric uplink/downlink bandwidth requirement. However, in contrast, a broadcast video service requires a largely asymmetric uplink/downlink bandwidth requirement. Most of the information provided during a broadcast video service is uni-directional (most of the information is transmitted from the base station to the subscriber unit via the downlink, with very little or no information transmitted via the uplink). Therefore, the uplink bandwidth requirement of such a service is negligible as compared to the downlink bandwidth requirement.

Second, the ratio of uplink/downlink bandwidth desired will vary between channels in a broadband services system because each channel shall carry a multitude of diverse services. Each service shall have its own unique bandwidth requirements for transmission and reception. Third, the need for symmetrical or asymmetrical communication in a channel varies depending upon the type of user. For example, in cases where a small business accesses the broadband services network for video conferencing or computer networking applications, the uplink/downlink bandwidth requirements shall be largely equal and symmetric. In contrast, in cases where a residential user accesses the broadband services network for video-on-demand (VOD) applications, the uplink/downlink bandwidth requirements shall be unequal and asymmetric. In these cases, the downlink shall require much more bandwidth than the uplink.

Therefore, a need exists for a method and apparatus which can flexibly and dynamically allocate uplink and downlink bandwidths in a time division duplexing scheme. The method and apparatus should be responsive to the needs of a particular link. The bandwidth needs may vary due to several factors, including the type of service provided over the link and the user type. The prior art systems have attempted to accommodate the need for asymmetric links by utilizing different modulation schemes for the uplink and the downlink. Under this approach, all typical bandwidth need scenarios are "averaged." This results in using a more spectrum efficient modulation scheme for the downlink. For example, a QAM-16 modulation scheme may be selected over a GMSK scheme. However, the prior art systems using this approach disadvantageously share the communication channel equally in time between the uplink and downlink transmissions. Consequently, the prior art solutions have been sub-optimal because they solve the asymmetry problem by satisfying the "average" bandwidth requirement.

However, as described above, the uplink and downlink bandwidths required in broadband networks and by broadband services are very unpredictable. In one sense, there is no average or typical scenario. Therefore, a need exists for an adaptive time division duplexing method and apparatus which can flexibly, efficiently, and dynamically allocate the uplink and downlink bandwidths for use in a broadband service network. The present invention provides such a adaptive time division duplexing method and apparatus.

SUMMARY OF THE INVENTION

The present invention is an adaptive time division duplexing (ATDD) method and apparatus for duplexing transmissions in wireless communication systems. The present ATDD invention facilitates the efficient use of communication channels in wireless communication systems by adapting to the uplink and downlink bandwidth requirements of the channels. In accordance with the present invention, the communication link bandwidth requirements are continuously monitored using sets of pre-determined bandwidth requirement parameters. The present ATDD invention flexibly and dynamically allocates time slots for either uplink or downlink transmissions in response to the changing bandwidth needs of the communication links. The present invention is particularly useful in wideband or broadband wireless communication systems, although it may also be used in any data communication system where an adaptive and dynamic time division duplexing transmission scheme is desirable.

In contrast to the TDD systems of the prior art which have time slots dedicated for either uplink or downlink transmissions, the present ATDD invention dynamically changes the time slot designation as either an uplink or downlink transmission period. Consequently, the uplink/downlink bandwidth allocation can be changed to accommodate the uplink/downlink bandwidth requirements of the link. The present ATDD invention thus advantageously allows channels to use either a symmetric or asymmetric uplink/downlink time slot allocation depending upon the needs of the channel. In the case of asymmetric time slot allocation, the present ATDD invention alternatively allows asymmetry in favor of the uplink (i.e., allocates more uplink time slots than downlink time slots) or in favor of the downlink (i.e., allocates more downlink time slots than uplink time slots).

A myriad of time slot allocation schemes are possible. One simplified time slot allocation scheme uses a "frame-based" approach which allows the system to dynamically allocate a first number of time slots of a frame for downlink (alternatively, uplink) transmissions only while configuring the remaining time slots of the frame for uplink (alternatively, downlink) transmissions. An alternative frame-based approach similarly allows the system to dynamically allocate a first number of time slots of a frame for downlink (alternatively uplink) transmissions only, however the remaining time slots of the frame may be allocated for either uplink or downlink transmissions, depending upon the channel bandwidth needs.

The present ATDD invention is particularly advantageous when used in a wireless communication system offering broadband data, video and telephone services. The wireless communication system preferably comprises a plurality of cells organized into cell clusters, each cell including a base station having an associated active antenna array, and each base station providing wireless connectivity to a plurality of customer sites having a plurality of customer premises equipment. The customers are presently contemplated to be either residential or small business users. The coordination of cell activity within a cell cluster is preferably controlled by a cluster controller. The broadband services include telephone services and data services such as fast internet, 10-BaseT data service, local area network and wide area network connectivity. Video services include broadcast video and video-on-demand services for residential users, and video conferencing and distance learning for business users.

In one preferred embodiment of the present invention, channel efficiency and data bandwidth improvements are achieved by using bandwidth requirement parameters to monitor and update the communication link time slot allocations. In accordance with the present invention, each communication session is preferably assigned both an "initial" and an "actual" set of bandwidth parameters. The initial set of bandwidth parameters can be established when the system is first installed. The actual set of bandwidth parameters are created and maintained by the system using the monitoring and updating technique of the present invention. Once the system learns about the exact nature of a communication session's bandwidth requirements it updates the initial values to accurately reflect the actual bandwidth requirements of the channel. In addition to assigning, monitoring, and updating session bandwidth parameters, the present ATDD invention also maintains a set of bandwidth parameters for both the base stations and the cluster controllers of the wireless communication system. The base station parameters are used in controlling the uplink/downlink time slot allocations for a given cell. The cluster parameters are used in controlling the uplink/downlink time slot allocations for all of the cells in a given cluster. One preferred technique of monitoring and controlling the uplink/downlink bandwidths is described. The technique described comprises two phases: an initialization phase and a tracking or monitoring phase. Other monitoring techniques can be used with the present invention.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The present invention is an adaptive time division duplexing (ATDD) method and apparatus for duplexing transmissions over a communication link in a wireless communication system. Without significantly altering existing wireless communication systems, the present ATDD invention facilitates the efficient use of communication channels by adapting to the uplink and downlink bandwidth requirements of the channels. The invention is particularly useful in wideband or broadband wireless communication systems, although it may be used with any data communication system where an adaptive and flexible time division duplexing transmission scheme is desirable or necessary.

Figure 1:
FIG. 1 is a timing diagram showing symmetric time slot allocations for uplink and downlink transmissions as used by prior art time division duplexing methods.

As described above, the typical TDD system uses a symmetric allocation of uplink and downlink transmissions. FIG. 1 is a timing diagram showing equal use of time slot allocations for the uplink and downlink transmissions as present in a typical TDD system of the prior art. As shown in FIG. 1, an uplink transmission occurs during a first time slot $T_a$. During the first time slot $T_a$, a selected subscriber station transmits information to a selected base station over a pre-determined radio frequency. Similarly, a downlink transmission occurs during a second time slot $T_b$. During this second time slot $T_b$, the selected base station transmits information to the selected subscriber unit over the same pre-determined radio frequency. As shown in FIG. 1, the communication channel continues to alternate symmetrically between uplink and downlink transmissions in the subsequent time slots. For example, during a third time slot $T_a'$ an uplink transmission occurs over the channel as in the first time slot $T_a$. Similarly, during a fourth time slot $T_b'$, a downlink transmission occurs as in the second time slot $T_b$, and so forth in the fifth time slot $T_a''$.

The TDD systems of the prior art fail to accommodate the dynamic and asymmetric bandwidth needs of a broadband communications network and associated broadband services. The present invention addresses these needs by providing an adaptive time division duplexing (ATDD) method and apparatus for use in a wireless communication system. The present ATDD invention flexibly and dynamically allocates the uplink and downlink bandwidths based upon the bandwidth requirement of a particular link. As described hereinabove, the uplink and downlink bandwidth requirements of a selected link in a wireless communication system vary due to the types of services and users of the selected link. The present ATDD method and apparatus adapts the time slot uplink/downlink ratio to meet the uplink/downlink bandwidth requirements of a given service and for a given user type.

Figure 2:
FIG. 2 is a timing diagram showing asymmetric uplink and downlink time slot allocations in accordance with the present invention.

FIG. 2 is a timing diagram showing how the present ATDD invention advantageously allocates time slots for uplink and downlink transmissions. In contrast to the TDD systems of the prior art wherein each time slot is fixed and dedicated for either an uplink or a downlink transmission, the present ATDD invention allows time slots to be flexibly and adaptively used for either uplink or downlink transmissions. Further, while the prior art channels shared bandwidth equally between the uplink and downlink transmissions, the present ATDD invention allows channels to be either symmetric or asymmetric in nature, depending upon the bandwidth needs of a particular link. FIG. 2 shows one possible time slot allocation scheme. However, it should be appreciated that the present invention is not limited to the time slot allocation shown in FIG. 2. Rather, the present ATDD invention contemplates a myriad of time slot allocations, wherein virtually any combination of uplink and downlink transmissions are possible.

As shown in FIG. 2, an uplink transmission occurs during a first time slot $T_a$. Similar to the timing diagram of FIG. 1, a downlink transmission occurs during a second time slot $T_b$. However, in contrast to the prior art TDD approaches, the ATDD method and apparatus of the present invention allows multiple contiguous and consecutive downlink (or, alternatively, uplink) transmissions to occur over a given channel. For example, as shown in FIG. 2, a second downlink transmission occurs during a third time slot $T_c$. Similarly, a third consecutive downlink transmission occurs during a fourth time slot $T_d$. The pattern repeats itself at a fifth time slot $T_a'$. As shown in FIG. 2, during the fifth time slot $T_a'$, an uplink transmission occurs over the channel as in the first time slot $T_a$. Similarly, during a sixth time slot $T_b'$, a downlink transmission occurs as in the second time slot $T_b$. During a seventh time slot $T_c'$, a second consecutive downlink transmission occurs as in the third time slot $T_c$, and so forth in an eighth time slot $T_d'$.

The present ATDD invention is particularly advantageous when used in a wireless communication system capable of providing wideband or broadband services, such as data, voice and video services. As described hereinabove, the present ATDD invention allows uplink and downlink bandwidths to be varied depending upon the particular needs of a communication channel and a particular user type. For example, the timing diagram shown in FIG. 2 allows seventy-five percent of the available bandwidth to be used for downlink communications and twenty-five percent for uplink communications. This uplink/downlink bandwidth ratio may be appropriate for some types of broadband data and video services, and for some types of network users.

The present ATDD method and apparatus is flexible in that it can use any given time slot for either an uplink or a downlink transmission. As described in more detail hereinbelow, the average bandwidth requirement for a given channel can be calculated using a variety of techniques. The time slot allocation for a link (i.e., the ratio of time slots used for uplink and downlink transmissions) is typically directly related to the bandwidth requirements of the link. Thus, once the average bandwidth requirement for a given link is determined, the time slot allocation can be established for that link using the present ATDD invention. For example, an average bandwidth requirement can be performed at the time that a selected link is first installed in the communication network. The average bandwidth requirement can depend upon such factors as the service profile or the system environment. The communication system uses the average bandwidth requirement information to configure the ratio of time slots used for the uplink and downlink transmissions over a given channel.

As an alternative to establishing the time slot ratio upon link installation, the ATDD method and apparatus of the present invention can also adaptively and dynamically change the time slot ratio for a link based upon the constantly varying service and user bandwidth requirements. The method and apparatus of the present invention preferably dynamically monitors and analyzes the service types and service bandwidth requirements presently active in the wireless communication network, and more specifically, active on any given radio communications link. The communication system can continuously monitor each link and gather information about each link's bandwidth requirements. The information gathered by the communication system can be used to re-examine, from time to time, the ratio of uplink and downlink time slots. The system can dynamically re-configure the time slot ratio according to each link's bandwidth needs. Consequently, a far improved channel bandwidth utilization and increased channel efficiency is achieved using the ATDD method and apparatus of the present invention. The increase in channel efficiency consequently translates into an increase in the number of users served and in the number of services offered by the communication system.

Figure 3A:
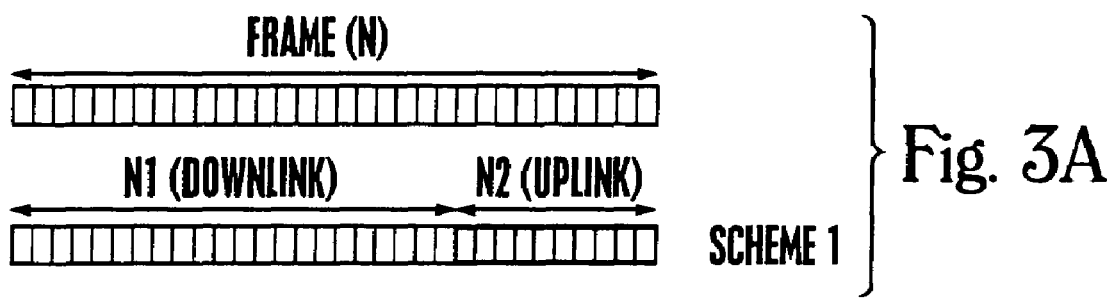
FIGS. 3a and 3b are timing diagrams showing frame-based adaptive time slot allocation schemes in accordance with the present invention.
Figure 3B:
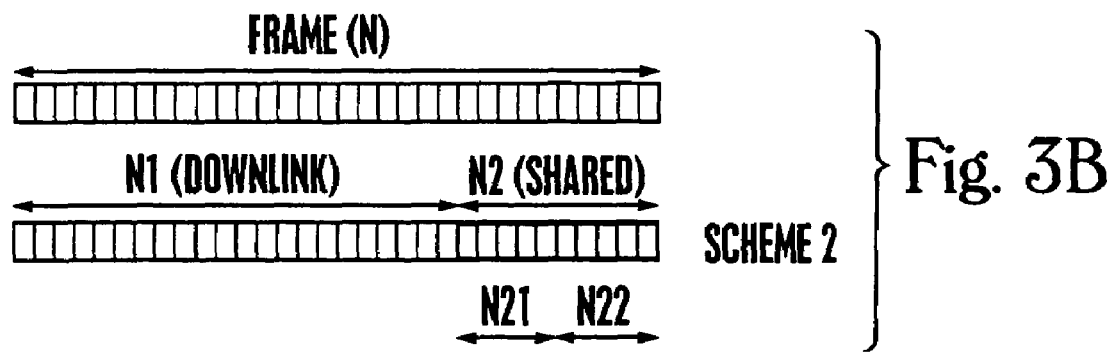

A simplified time slot allocation process can be achieved by using a "frame-based" allocation scheme as shown in FIGS. 3a and 3b. As shown in FIGS. 3a-3b, a frame is defined as comprising N consecutive time slots (where N remains constant). In the first "frame-based" approach shown in FIG. 3a, the communication system dynamically configures the first $N_1$ time slots (where N is greater than or equal to $N_1$) for downlink transmissions only. The remaining $N_2$ time slots are dynamically configured for uplink transmissions only (where $N_2$ equals $N-N_1$).

A second frame-based approach for allocating time slots in a communication channel is shown in FIG. 3b. This frame-based allocation scheme is similar to that shown in FIG. 3a, with the exception that the remaining $N_2$ time slots are no longer configured only for uplink transmissions. Specifically, as shown in FIG. 3b, and identically to the first frame-based approach of FIG. 3a, the first $N_1$ time slots (where N is greater than or equal to $N_1$) are dynamically configured for downlink transmissions only. However, in contrast to the frame-based approach of FIG. 3a, the remaining $N_2$ (where $N_2$ equals $N-N_1$) time slots are not configured for uplink transmissions only. Rather, the remaining $N_2$ time slots can be used either for uplink or downlink transmissions, depending upon the bandwidth requirements of the channel. For example, as shown in FIG. 3b, the first five $N_2$ time slots ($N_{21}$) are used for uplink transmissions. The next five consecutive $N_2$ time slots ($N_{22}$) are used for downlink transmissions.

The time slot allocations shown in FIGS. 3a and 3b are exemplary only, and the scope of the present invention should not be limited by the number of time slots or the uplink/downlink allocations shown. For example, although the first $N_1$ time slots of a frame are shown in FIGS. 3a and 3b as configured for downlink transmissions only, they could alternatively be configured for uplink transmissions, with the remaining $N_2$ time slots configured for downlink transmissions. Similarly, the number of time slots in a frame can vary without departing from the scope of the present invention. Finally, the number of time slots used for $N_1$, $N_2$, $N_{21}$, and $N_{22}$ can vary without departing from the scope of the present ATDD invention.

In addition, the present invention contemplates use in TDD systems which, for all intents and purposes, remain stable and therefore not adaptive, yet which facilitate asymmetric bandwidth allocation. For example, the present ATDD method and apparatus can be used to initially configure a radio communications link to have the bandwidth allocation shown in FIGS. 3a and 3b. Once the link is so configured, it can remain stable and asymmetric. As those skilled in the art will appreciate, virtually any ratio of uplink to downlink allocations can be established using the present ATDD method and apparatus.

As described above, the ATDD method and apparatus of the present invention is contemplated for use in a wireless communication system capable of offering broadband data and video services to a variety of residential and business users. A brief description of such a preferred wireless communication system is given below. The wireless system demonstrates one potential application for the present invention. However, the present ATDD invention is not limited for use in the particular system described. Rather, the present ATDD invention has a broad range of applications and can find utility in many different communication environments.

Figure 4:
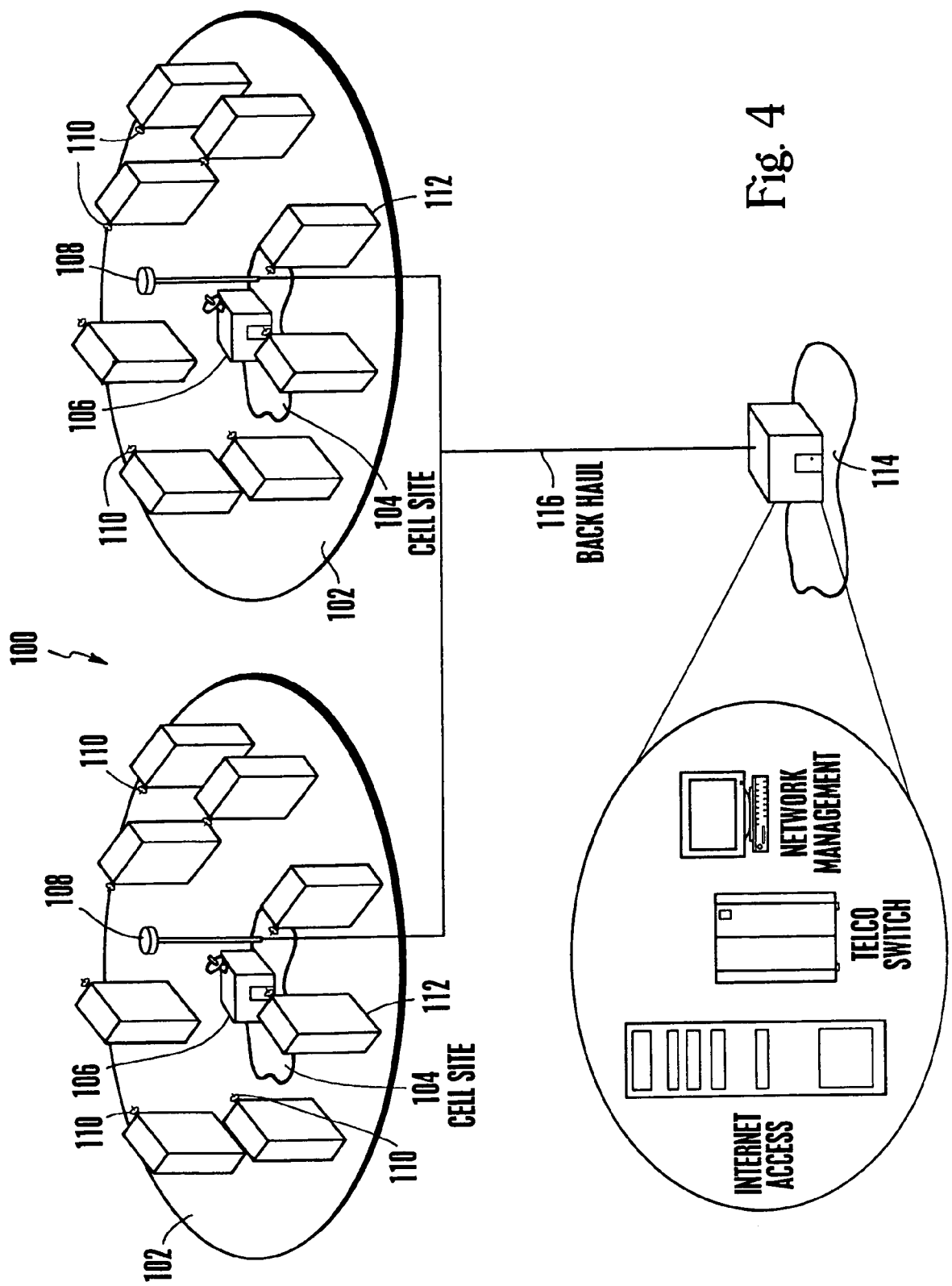
FIG. 4 is a block diagram of an exemplary broadband wireless communication system for use with the present invention.

Description of a Wireless Communication System for Use with the Present ATDD Invention—System Overview As described above, the present ATDD invention is particularly useful in a broadband wireless communication system wherein the communication links in the system must adapt their uplink and downlink bandwidth allocations to accommodate the bandwidth requirements of a given service or user type. Such an exemplary wireless communication system is shown in the block diagram of FIG. 4. In cellular communication systems, geographic areas or regions are typically divided into cells that are theoretically hexagonally shaped. The size of a cell is typically defined by the transmitting coverage of a base station which is usually centered within the cell it serves. For example, the average cell radius of the cells shown in FIG. 4 is typically between 2.5 and three kilometers. However, the operability of the present ATDD invention is not dependent upon the cell size. Rather, the present ATDD invention can be used in wireless systems having larger or smaller cells. Each cell within the system is typically allocated one or more radio frequency channels. In a frequency division multiple access (FDMA) system, adjacent or nearby cells are assigned separate frequencies.

Referring again to FIG. 4, the wireless communication system 100 comprises a plurality of cells 102. Each cell 102 contains an associated cell site 104 which primarily includes a base station 106 and an active antenna array 108. Each cell 102 within the wireless communication system 100 provides wireless connectivity between the cell's base station 106 and a plurality of customer premises equipment (CPE) 110 located at fixed customer sites 112 throughout the coverage area of the cell 102. It is presently contemplated that the users of the system 100 will be both residential and business customers, and thus will require various types of services and varying uplink/downlink bandwidth allocations. Each cell shall service approximately 1,000 residential subscribers and approximately 300 business subscribers. As shown in FIG. 4, the cell sites 104 communicate with a communications hub 114 using a "non-radio frequency" type of communication link or "back haul" 116. The back haul 116 preferably comprises either a fiber-optic cable or a microwave link. The communications hub 114 interfaces the wireless communication system 100 with public network service providers via one or more wired communications links (not shown).

The radio communication within a cell 102 is preferably bi-directional in nature. Information is allowed to flow in both directions between the base stations 106 and the plurality of CPEs 110. The base station 106 preferably broadcasts multiple simultaneous high bit-rate channels. Each channel comprises different multiplexed information streams. The information in a stream includes address information which enables a selected CPE 110 to distinguish and extract the information intended for it. The wireless communication system 100 of FIG. 4 provides true "bandwidth-on-demand" to the plurality of CPE 110. The quality of the services available to customers using the system 100 is variable and selectable. The amount of bandwidth dedicated for a given service is determined by the information rate required by that service. For example, a video conferencing service requires a great deal of bandwidth with a well controlled delivery latency. In contrast, certain types of data services are often idle (which then require zero bandwidth) and are relatively insensitive to delay variations when active. The ATDD method and apparatus of the present invention can be used in the system of FIG. 4 to facilitate the efficient delivery of both service types in addition to others.

Communications Hub

Figure 5:
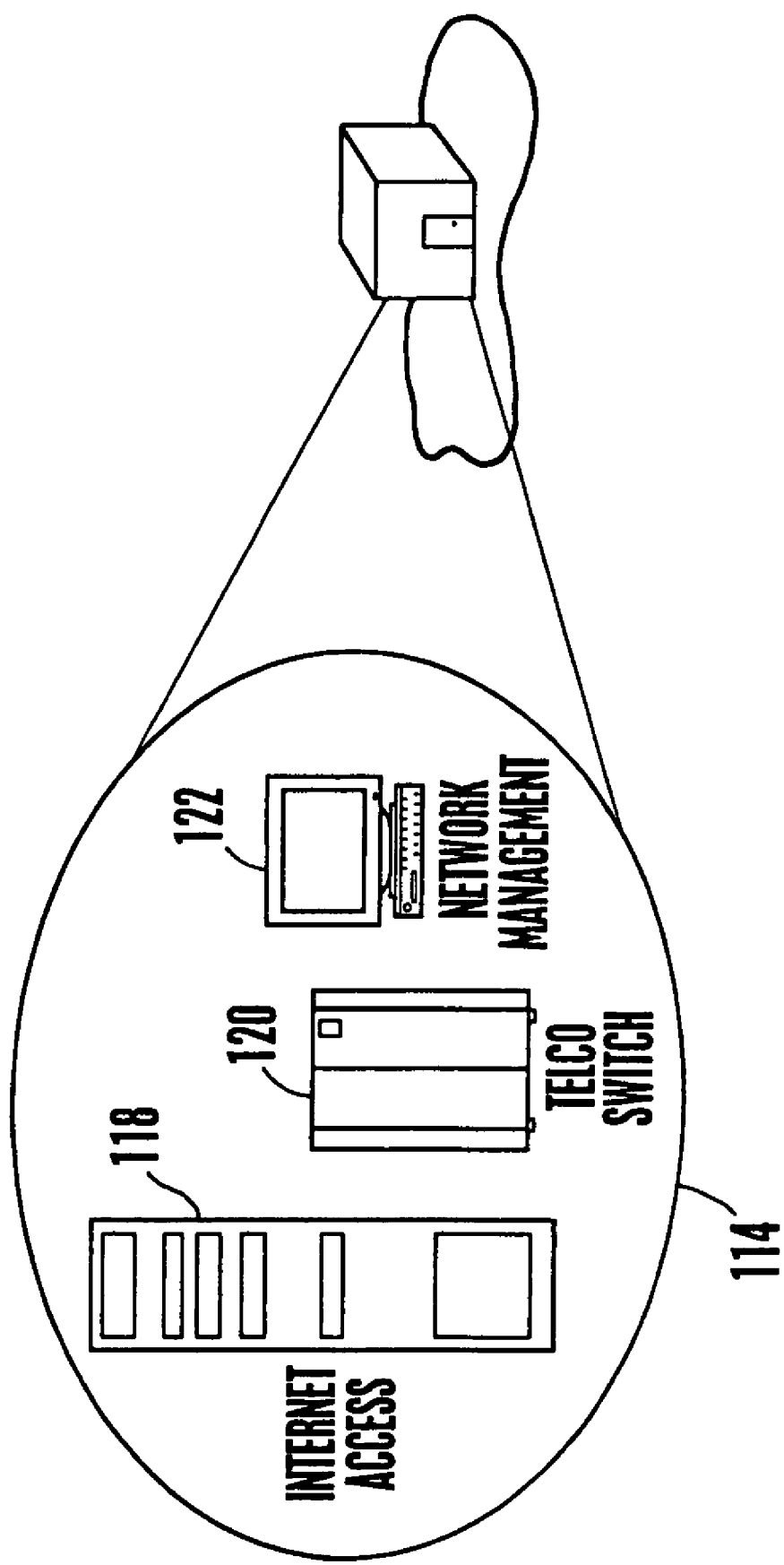
FIG. 5 is a block diagram of a communication hub used in the wireless communication system of FIG. 4.

FIG. 5 shows a block diagram of the communication hub 114 of FIG. 4. As shown in FIG. 5, the communication hub 114 preferably includes at least an internet access apparatus 118, a telecommunications company electronic switching apparatus (Telco Switch) 120, and a network management computer system 122. As noted above, the hub 114 provides access to public networks (typically wired) such as voice (i.e., Telco "POTS") and data (i.e., "Internet") networks to allow users of the wireless network 100 (FIG. 4) access to the services provided by these networks. All of the services provided by the public networks are typically "back-hauled" to the hub 114 via a non-RF communication link (not shown). The public networks are interfaced within the hub 114 by appropriate access and switching equipment. For example, access to a public switched telephone network is provided via the Telco switch 120. Similarly, access to the world-wide web or Internet is provided via the internet access apparatus 118. The network management computer system 122 preferably enables the hub 114 to also function as a regional network management controller. Using the system 122 the hub can control and coordinate the operation of a plurality of cells 102. This cell controller function is described in more detail hereinbelow with reference to the description of one preferred system parameter monitoring technique.

Cell Site

Figure 6:
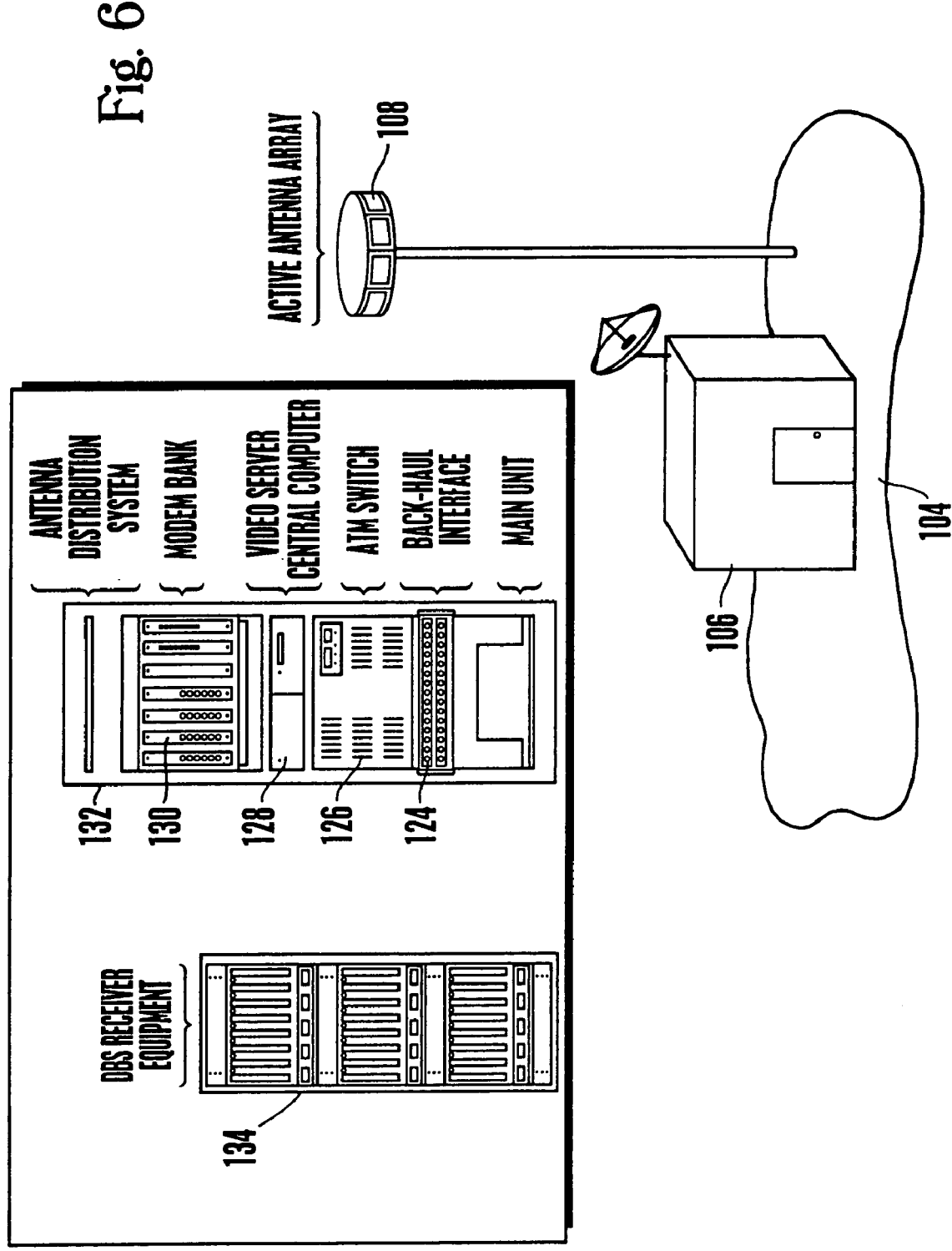
FIG. 6 is a block diagram of cell site used in the wireless communication system of FIG. 4.

FIG. 6 shows a block diagram of the cell site 104 of FIG. 4 used in the wireless communication system 100. As described above, the cell site 104 preferably comprises a base station 106 and an active antenna array 108. As shown in FIG. 6, the base station preferably includes back-haul interface equipment 124, an ATM switch 126, a video server control computer 128, a modular modem bank 130, an antenna distribution system 132 and direct broadcast satellite (DBS) receiver equipment 134. The base station can also alternatively include a video server (not shown in FIG. 4). The back-haul interface equipment 124 allows the base station to communicate with the hub 114 (FIGS. 4 and 5). The ATM switch 126 functions at the core of the base station 106 to interconnect the various services and subscribers at appropriate service and bandwidth levels. The modular modem bank 130 and active antenna distribution system 132 facilitate the wireless communication between the base station 106 and the plurality of CPE 110 (FIG. 4) in the cell 102 served by the base station.

The base station 106 and more particularly the modem bank 130 is preferably modular in design. The modular design of the base station 106 allows the installation of lower capacity systems that can be upgraded in the field as capacity needs dictate. The modem bank 130 performs both the media access protocol layer and the modulation/de-modulation functions that facilitate high-speed communication over the wireless link. The modem bank 130 preferably is connected via a cable to the active antenna array 108 which is preferably mounted on a tower or a pole proximate the base station 106. The active antenna array 108 preferably contains high-frequency radio electronics (not shown) and antenna elements.

CPE

Figure 7:
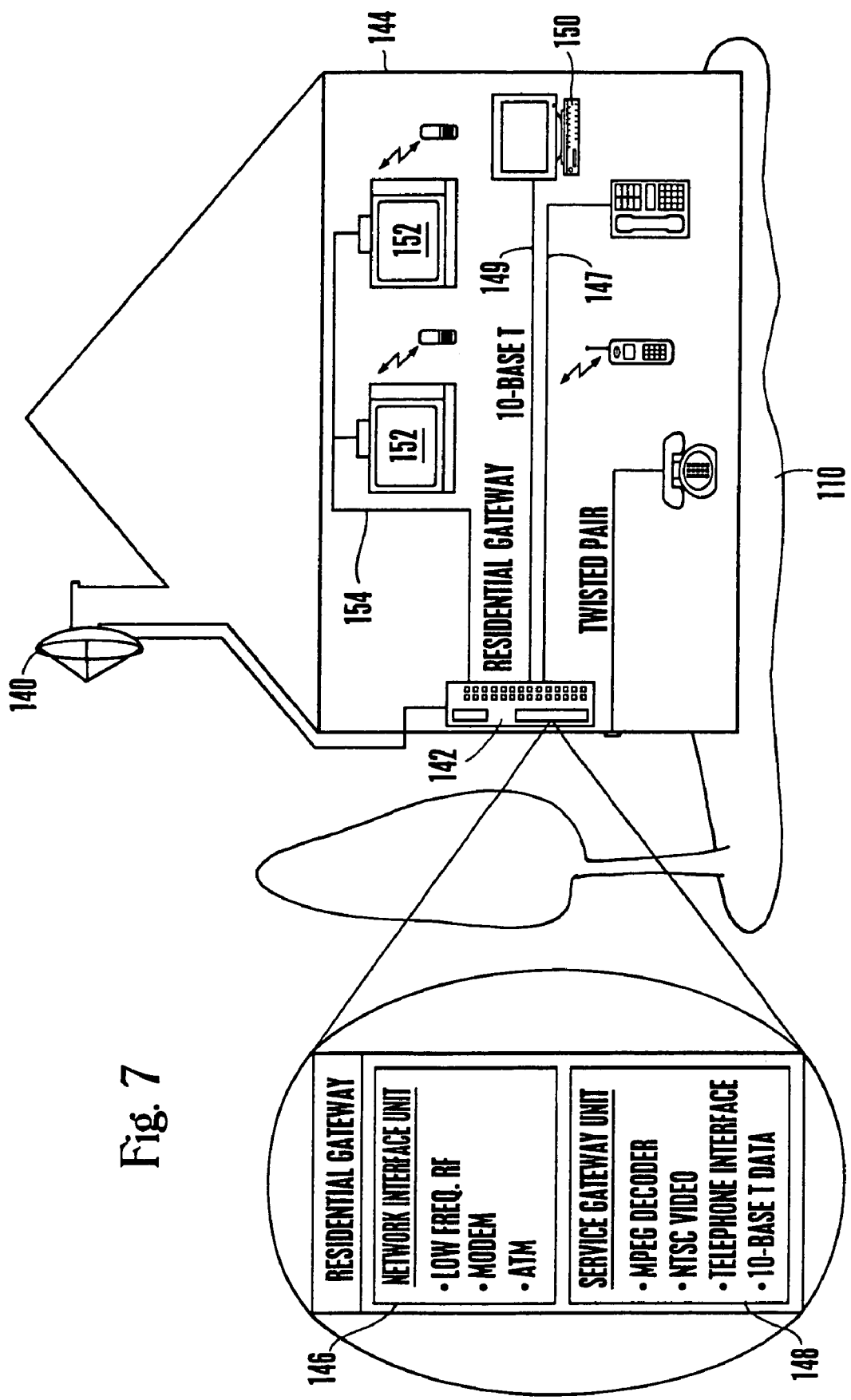
FIG. 7 is a block diagram of a preferred residential customer premises equipment (CPE) used in the wireless communication system of FIG. 4.
Figure 8:
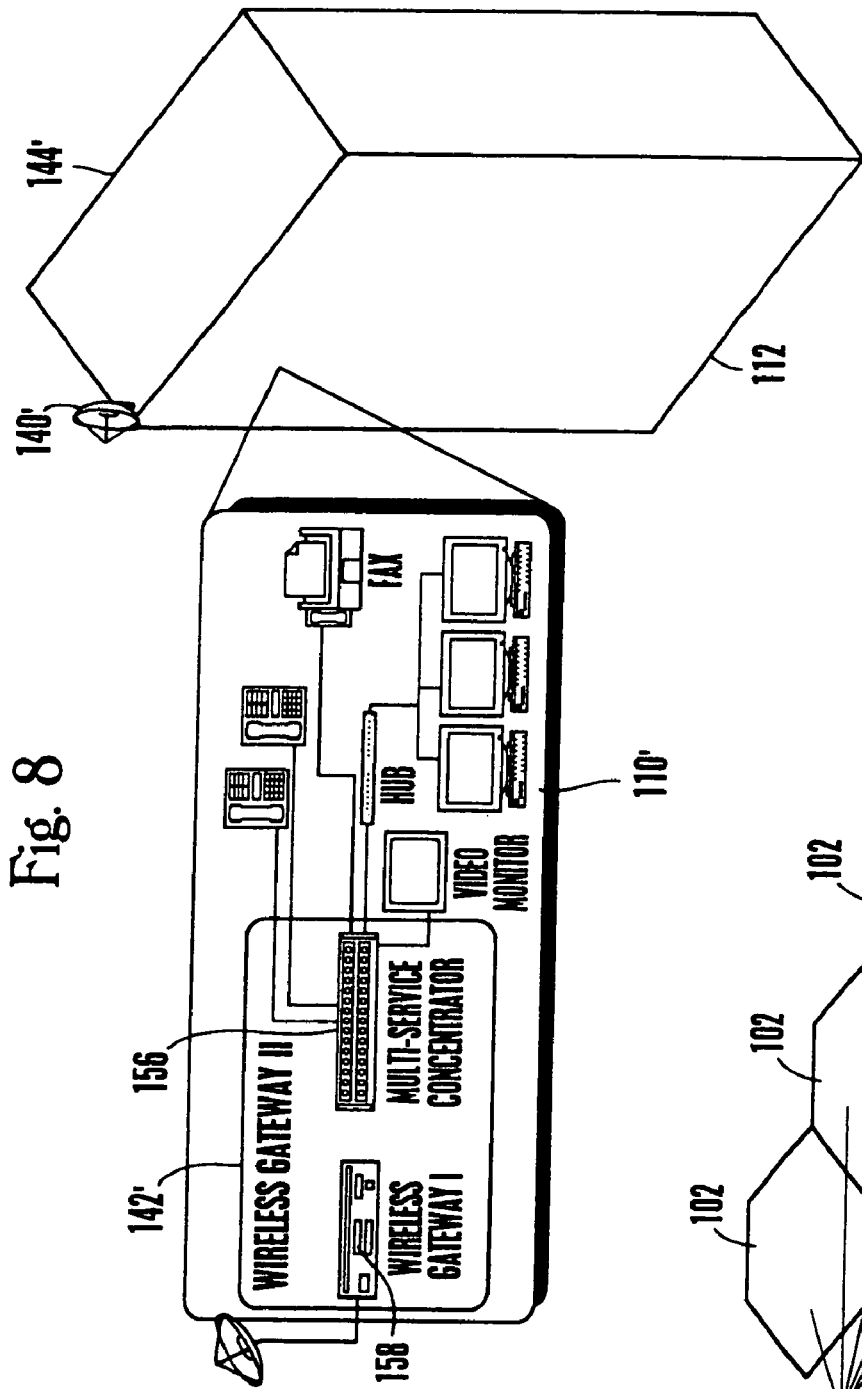
FIG. 8 is a block diagram of a preferred business customer premises equipment (CPE) used in the wireless communication system of FIG. 4.

FIGS. 7 and 8 are block diagrams of the customer premises equipment (CPE) 110 shown in FIG. 4. As described above, the subscribers of the wireless communication system contemplated for use with the present ATDD invention may be either residential or business customers. FIG. 7 is a block diagram of a preferred residential CPE 110. FIG. 8 is a block diagram of a preferred business CPE 110'. As shown in FIG. 7, the residential CPE 110 preferably includes an antenna 140 and a residential wireless gateway apparatus 142. The residential gateway 142 is preferably installed on a side of the residence 144. An up/down converter (not shown) is preferably co-located with the antenna 140. The residential gateway 142 preferably includes a network interface unit (NIU) 146 and a service gateway unit 148. The NIU 146 performs the functions necessary to allow the residential user to communicate with the wireless communication system, such as performing low frequency RF communication, modem and ATM functions. The NIU 146 performs the necessary communication interface functions including airlink and protocol interface functions to allow the residential user access to the network. The service gateway unit 148 allows the residential user to gain access to the services provided over the communications system. For example, as shown in FIG. 7, the service gateway unit 148 preferably includes an MPEG decoder, NTSC video interface, telephone interface and 10-baseT data interface.

The residential gateway 142 interfaces to the various service access points within the residence 144. The residential gateway 142 contains the necessary hardware and software for interfacing to the radio communications airlink and for driving various services into the residence 144. In addition, by interfacing with the telephone wiring 147 within the residence 144, the residential gateway 142 is capable of providing a variety of telephone services to the residence 144. Similarly, by interfacing with copper or co-axial wiring 149 within the residence 144, the residential gateway 142 is capable of providing 10-baseT and other data services to equipment 150 (such as a personal computer depicted in FIG. 7) within the residence 144. Finally, the residential gateway 142 can also provide broadcast video and data-centric television services to a plurality of television systems 152 by interfacing with standard cable television co-axial cabling 154 in the residence 144. The residential gateway 142 is designed in a modular fashion to service multiple data, telephone, and video lines. Thus, a single residential gateway 142 is sufficiently flexible to accommodate the communication needs of any residential customer.

FIG. 8 is a block diagram of the preferred business CPE 110' of FIG. 4. The preferred business CPE 110' is designed to provision and provide services to a small business customer site 112. As shown in FIG. 8, the business CPE 110' preferably includes an antenna 140' and a business wireless gateway apparatus 142'. The antenna 140' is preferably affixed to the business site building 144' and includes a co-located up/down converter (not shown). The business gateway 142' is preferably installed in a wiring closet within the business site building 144'. The communication interfaces of the business gateway 142' are similar to those of the residential gateway 142 (FIG. 7). However, the service interfaces of the business gateway 142' differ from those of the residential gateway 142. The business gateway 142' preferably includes interfaces capable of driving voice and data services typically used by small business customers. These include integrated services digital network (ISDN), local area network (LAN), PBX switching and other standard voice and data services.

As shown in FIG. 8, a "two-box" solution is presently contemplated for implementing the business gateway 142'. An "off-the-shelf" multi-service concentrator 156 can be used to provide the business user services and to convert the outgoing data into a single transport stream. The business gateway 142' also includes a wireless gateway apparatus 158 which contains the necessary hardware and software for interfacing to the radio communications airlink and for driving various services into the business site building 144'. Alternatively, the wireless functionality provided by the business gateway 142' can be integrated into the multi-service concentrator 156 in order to reduce costs and provide a more integrated business gateway solution. Different types of multi-service concentrators 156 can be used depending upon the size and needs of the business customer. Thus, a network provider can deploy a cost effective solution with sufficient capabilities to meet the business customer's needs.

Various types of services can be provided to the business customer using the CPE 110' of FIG. 8. For example, by providing standard telephone company interfaces to the business customer, the business CPE 110' gives the customer access to telephone services yet only consumes airlink resources when the telephone services are active. Network providers therefore achieve significant improvements in airlink usage efficiency yet are not required to modify or overhaul conventional interfaces with the business customer's equipment (e.g., no changes need to be made to PBX equipment). In addition, the business gateway 142' can support HSSI router and 10-BaseT data interfaces to a corporate LAN thereby providing convenient Internet and wide area network (WAN) connectivity for the business customer. The business gateway 142' will also enable a network provider to provision "frame-relay" data services at the customer's site. The business gateway 142' can support symmetrical interface speeds of 10 Mbps and higher.

Finally, the CPE 110' facilitates the transmission of various types of video services to the business user. The video services preferably primarily include distance learning and video conferencing. However, in addition, the business CPE 110' can include ISDN BRI interfaces capable of supporting conventional video conferencing equipment. Using these interfaces, the business users will have the option of either viewing or hosting distance learning sessions at the business site building 144'.

As described above, the present ATDD method and apparatus allows time slots to be dynamically re-configured to meet the bandwidth needs of each link in the communication system. A simplified approach is to establish and fix each communication link's uplink/downlink time slot ratio at the time that the link is initially installed. A more complex yet more efficient approach requires that the communication system monitor several different system parameters in order to adaptively and dynamically change the channel time slot ratio based upon the varying bandwidth requirements. One preferred method and apparatus for monitoring the communication system parameters and for updating the channel time slot ratio is described below. Although one technique is described herein, the present ATDD invention contemplates several alternative approaches.

Figure 9:
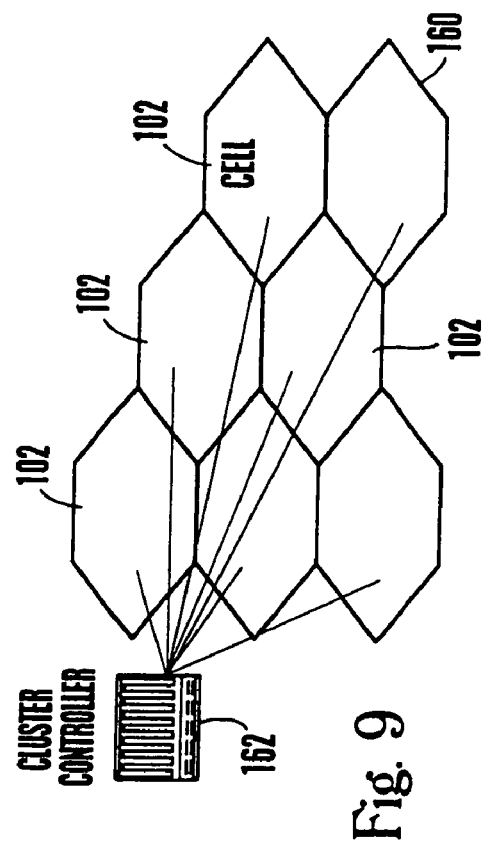
FIG. 9 is a block diagram of a cell configuration showing the cells of FIG. 4 grouped into a cell cluster wherein the cell cluster comprises seven contiguous cells.

One Preferred Method for Monitoring System Bandwidth Requirements and Updating Uplink/Downlink Time-Slot Allocations If the cells 102 of FIG. 4 are in sufficiently close proximity to each other and the base stations 106 use similar frequencies for the transmission and reception of radio signals, significant co-channel interference and signal distortion can result. To reduce the deleterious effects of co-channel interference, the prior art cellular communication systems typically organize contiguous cells 102 into relatively small groups (usually between four and eight cells per cluster) of "cell clusters". FIG. 9 shows the cells 102 of FIG. 4 grouped into a cell cluster 160 wherein the cluster 160 comprises seven contiguous cells 102. The prior art cellular communication systems typically assign different transmit and receive frequencies to each cell 102 (and their respective base stations) within a cluster 160 to reduce the co-channel interference caused by base stations in the cluster. Contiguous cell clusters 160 are typically assigned the same transmit and receive frequencies by the carrier. This practice is commonly referred to as "frequency reuse".

In the communications system used to practice the present ATDD invention, co-channel interference is reduced by synchronizing the cell transmit/receive base stations 106 within a cluster 160 to a common time base. In systems which also synchronize the transmit and receive base stations across different clusters, the common time base for a given cluster 160 may be generated by use of Global Positioning System (GPS) receivers, local time broadcasts, network timing, or other techniques. Thus, the transmissions and receptions of all base stations 106 within a cluster 160 are preferably synchronized.

As shown in FIG. 9, the synchronization, control and management of base stations 106 within a cluster 160 is preferably performed by a cluster controller 162. The cluster controller 162 controls the operation, timing and uplink/downlink bandwidth allocations of each of the base stations 106 in a cluster 160. In some systems, the functions performed by the cluster controller 162 can be implemented by the network management computer system 122 described above and located in the hub 114 of FIG. 5. Because the cluster controller 162 controls and coordinates the transmissions and receptions of all base stations 106 within a cluster 160, the ATDD control method and apparatus of the present invention is preferably performed by the cluster controller 162. Thus, the control of time slot allocations for each base station 106 of a cluster 160 using the ATDD management scheme is preferably performed by the cluster controller 162, and not by the individual base stations 106 of each cell 102. However, the base stations 106 monitor the bandwidth requirements of their respective cells 102, report results back to the cluster controller 162, and accept updates and commands from the cluster controller 162 thereby changing the uplink/downlink time slot allocations based upon the bandwidth requirements.

Communication transactions or events between a CPE 110 (or 110') of FIG. 4 and an associated base station 106 are referred to as communication "sessions." For example, when a residential customer accesses a CPE 110 to order a "movie on demand", a video services session is created. Similarly, when a business customer uses a CPE 110' to gain access to the Internet, a data services session is created. In accordance with the present ATDD invention, each session is preferably associated with a set of statistical parameters which reflect the bandwidth requirements of the session.

Each session is preferably assigned both an "initial" and an "actual" set of bandwidth parameters. The initial set of bandwidth parameters can be established when the system is first brought "on-line" and services are initialized. The initial parameter set can thus be thought of as "factory-set" parameters. For example, all voice telephony calls can use the following initial bandwidth parameters: 64 Kbps data rate; constant bandwidth; and symmetric uplink and downlink bandwidth requirements. The "actual" set of bandwidth parameters are created as the communication system monitors and thereby "learns" more about the exact nature of a given session's bandwidth requirements. After some interval of time after the initial parameter values are established, the values are preferably updated with the actual bandwidth parameters. For example, although all MPEG-2 encoded videos and movies may use the same initial bandwidth parameter set, they will be updated with differing actual parameter sets due to differing video content. Some videos will have involved special effects, fast scene changes, and complex imagery, and will therefore require greater downlink bandwidth, while others will have less demanding bandwidth needs.

In addition to assigning, monitoring, and updating session bandwidth parameters, the present ATDD invention also maintains a set of bandwidth requirement parameters for both the base stations 106 (FIGS. 4 and 6) and the cluster controllers 162 (FIG. 9) of the wireless communication system. The base station bandwidth requirement parameters are used in controlling the uplink/downlink time slot allocations for a given cell 102 (FIG. 4). The cluster bandwidth requirement parameters are used in controlling the uplink/downlink bandwidths for all of the cells (and their associated base stations 106) in a given cluster 160 (FIG. 9).

Similar to the service session bandwidth parameters described above, the base station and cluster controller bandwidth parameters also have associated "initial" and "actual" values. For example, the number of expected customers and the customer types (i.e., residential versus business) in a given cell 102 influences the bandwidth requirements and uplink/downlink time-slot allocations for the cell. In accordance with the present ATDD invention, the bandwidth parameter value for every base station in the system is initialized to some desired value. The initial values are preferably based upon the number of expected customers and customer types serviced by each base station. However, the present invention is not limited to basing the initial bandwidth value only on the number of customers and the customer type. Virtually any factor that influences the bandwidth requirements of a cell or cluster can be accommodated using the present ATDD inven tion. Preferably, the cluster controller 162 provides these parameters to the base stations upon system installation. The cluster controller 162 is also preferably provided an initial parameter value based upon the number of expected customers and customer types in a given cluster coverage area.

Both the base stations' and the cluster controller's initial bandwidth parameter values are updated to reflect the actual bandwidth utilization and requirements of the system. Using the present invention, bandwidth utilization is continuously monitored by the system during operation. The initial parameter set values of both the base stations and the cluster controller can be updated after a desired time interval. The base station preferably monitors all requests for service sessions including those denied due to capacity limits. The actual parameter set of a given cluster controller is updated by the base stations it serves. The base stations preferably communicate the bandwidth requirement variations to their associated cluster controller. Subsequently, the cluster controller updates its initial parameter set and communicates these revisions to the base stations in its cluster coverage area.

The following describes one method of monitoring and adapting to variations in communication link bandwidth requirements in a wireless communication system using the present ATDD invention. However, the present invention is not limited to the analysis technique described below. Several techniques can be used, as long as they accurately account for the bandwidth requirements of the system. No matter what technique is used, the present ATDD invention can be employed to flexibly adapt the uplink/downlink time slot allocation and bandwidth once the bandwidth requirements are determined.

The technique used to monitor and control the uplink/downlink bandwidths fundamentally comprises two phases: an initialization phase and a "tracking" or "monitoring/updating" phase. During the initialization phase all of the base stations and cluster controllers are provided with an initial set of bandwidth parameters as described above. During the tracking phase, the system monitors and thereby learns about the actual bandwidth requirements of the system. The system then adapts to the bandwidth needs by updating the initial bandwidth parameters with the actual bandwidth parameters. The base stations preferably autonomously monitor and learn about the bandwidth requirements of their respective links using a session-based approach. The base stations preferably report results back to their associated cluster controller.

Base Station Bandwidth Analysis

Each base station in a cell cluster preferably autonomously analyzes its uplink and downlink bandwidth utilization and periodically reports back to an associated cluster controller. In performing the utilization analyses, each base station preferably uses a set of pre-defined bandwidth utilization parameters. These utilization parameters are preferably reported back to the cluster controller upon request by the controller. In addition to monitoring and updating the bandwidth utilization parameters, the base stations also track rejected session requests (i.e., transmission requests or sessions which were requested but not initiated due to capacity limitations in the link). The rejected sessions are preferably tracked using a different set of base station parameters. The rejected session parameters are also reported back to an associated cluster controller periodically or upon request from the controller.

The utilization parameters are filtered (smoothed) moments of the instantaneous bandwidth consumed for uplink (U) and downlink (D) bandwidth needs. Defining $U^{(M)}_n, D^{(M)}_n$ as the uplink and downlink filtered moments (of order M, at instant n) then, $$\begin{pmatrix} U^{(M)}_{n+1} \\ D^{(M)}_{n+1} \end{pmatrix} = \alpha_M \begin{pmatrix} U^{(M)}_n \\ D^{(M)}_n \end{pmatrix} + (1-\alpha_M) \begin{pmatrix} (U_n - U^{(1)}_n)^M \\ (D_n - D^{(1)}_n)^M \end{pmatrix}$$

where $\alpha_M < 1$, $M > 1$ $$\begin{pmatrix} U^{(1)}_{n+1} \\ D^{(1)}_{n+1} \end{pmatrix} = \alpha_1 \begin{pmatrix} U^{(1)}_n \\ D^{(1)}_n \end{pmatrix} + (1-\alpha_1) \begin{pmatrix} U_n \\ D_n \end{pmatrix}$$

where $\alpha_1 < 1$, $M=1$;

$U_n$, $D_n$ are the accumulated uplink and downlink bandwidth requirements influenced by the actual bandwidth parameter set of a session. For practicality issues, M<3 is preferable. In a simple example where M=1, only simple averages of uplink and downlink traffic are used to compensate allocation parameters.

$U'_n$, $D'_n$ comprise a moving average version of the uplink and downlink bandwidth requirements of rejected sessions. The rejected session analysis updates the parameters $U'_n$, $D'_n$ in the following way. If a session is rejected, then its bandwidth requirements $\delta U$ and $\delta D$ are used:

$$\begin{pmatrix} U'_{n+1} \\ D'_{n+1} \end{pmatrix} = \gamma_1 \begin{pmatrix} U'_n \\ D'_n \end{pmatrix} + (1-\gamma_1) \begin{pmatrix} \delta U \\ \delta D \end{pmatrix} \quad \gamma_1 < 1$$

If a session is not rejected, then the parameters are updated using, $$\begin{pmatrix} U'_{n+1} \\ D'_{n+1} \end{pmatrix} = \gamma_2 \begin{pmatrix} U'_n \\ D'_n \end{pmatrix}$$

where $\gamma_2 < 1$

It should be noted that (1 and (2 can be different to allow different time constants for decay and build-up.

Cluster Controller Analysis

The cluster controllers preferably periodically poll their associated base stations and update their own bandwidth utilization parameters. One preferred method is presently described. First, define the number of time slots within a frame available for dynamic allocation as N. Let $N_1, N_2 \ldots N_M$ be positive integers where $$\sum_{k=1}^{M} N_k = N$$

Due to practical considerations, preferably $N_1 > N_2 > \ldots > N_M$, and M is typically less than 3.

The cluster controller preferably calculates the following bandwidth parameters every time a base station update occurs:

1) For each k (k=1, 2, ... M):
(a) Sum of all uplink requirements from all associated base stations $$S_u^{(k)} = \Sigma^k \sqrt{U^{(k)}};$$

(b) Sum of all downlink requirements from all associated base stations $$S_d^{(k)} = \Sigma^k \sqrt{D^{(k)}}.$$

2) The cluster controller then calculates an estimated bandwidth allocation scheme as follows:

$$\hat{N}_d = INT\left[\sum_{k=1}^{M} \frac{N_k S_d^{(k)}}{S_d^{(k)} + S_u^{(k)}}\right] \quad \hat{N}_u = N - \hat{N}_d$$

3) The estimated bandwidth allocation scheme is compared to the one presently being used by the controller. If there are differences between the allocation scheme calculated in step 2) and the one presently being used, beyond a certain, pre-defined threshold, then the current allocation scheme is updated with the one calculated in step 2) as follows:

if $|N_d - \hat{N}_d| \geq \mu$ then $N_d \leftarrow \hat{N}_d$ and $N_u \leftarrow \hat{N}_u$ The rejected session parameters are also analyzed. First the cluster controller preferably performs the following calculations:

1) Sum of all uplink rejected session requirements from all base stations $S'_u = \Sigma U'$ 2) Sum of all downlink rejected session requirements from all base stations $S'_d = \Sigma D'$ 3) Expected allocation scheme based on the rejected session parameters, $$\begin{pmatrix} \tilde{N}_u \\ \tilde{N}_d \end{pmatrix} = \frac{1}{S'_d + S'_u} \begin{pmatrix} S'_u \\ S'_d \end{pmatrix}$$

If there are a sufficient number of rejected sessions then they will probably influence the current bandwidth allocation. Therefore, the cluster controller preferably calculates and updates its parameters as follows:

if $\text{Max}(S'_u, S'_d) > S_o$ (i.e., there is a noticeable session rejection pattern) then, if $|N_d - \tilde{N}_d| > \mu$ (i.e., there is sufficient deviation) then, if $\tilde{N}_d > N_d$ and $N_d < N - \delta$ then, $N_d \leftarrow N_d + \delta$ if $\tilde{N}_d < N_d$ and $N_d > \delta$ then, $N_d \leftarrow N_d - \delta$ and, update the uplink allocation if the downlink has changed, $N_u \leftarrow N - N_d$;

else alert the entire system of this cluster's capacity limitations (i.e., there is a need to increase the bandwidth capacity of this cluster)

$S_o$, $\mu$ and $\delta$ are constants.

After performing these calculations the cluster controller will then update all of its associated base stations if the values of $N_d$, $N_u$ have changed. The cluster controller will then re-configure its ATM equipment to accommodate changes in bandwidth requirements.

The inventive ATDD method and apparatus may be implemented in hardware or software, or a combination of both. In particular, the bandwidth parameter sets associated with the communication sessions, base stations and cell cluster controllers may be implemented in computer programs executing on programmable processors in the base stations and the cluster controllers of a wireless communication system. Similarly, the bandwidth analysis technique described above is preferably implemented in computer programs executing on programmable processors in the cluster controller. Each computer program is preferably stored on a storage media or device (e.g., ROM or magnetic diskette) readable by a general or special purpose computer, for configuring and operating the computer when the storage media or device is read by the computer to perform the functions described above. The inventive ATDD method and apparatus may also be considered to be implemented as a computer-readable storage medium, configured with a computer program, where the storage medium so configured causes a computer to operate in a specific and predefined manner to perform the ATDD method and apparatus described above.

In summary, the invention includes an adaptive time division duplexing method and apparatus for dynamically adapting to the bandwidth requirements of a wireless communication system by allocating time slots for uplink and downlink transmissions depending upon the bandwidth needs of the channel. The present invention is particularly useful in broadband wireless communication systems, however it finds utility in any data communication system where an adaptive and dynamic time division duplexing transmission scheme is desired. The present ATDD invention dynamically changes the time slot designation in a communication link for either an uplink or downlink transmission. Thus, communication channels can either have a symmetric or asymmetric uplink/downlink bandwidth characteristic. A myriad of time slot allocation schemes are possible. A simplified time slot allocation scheme is described which uses a "frame-based" approach.

In one preferred embodiment of the present invention, channel efficiency and data bandwidth improvements are achieved by using bandwidth requirement parameters to monitor and update the communication link time slot allocations. In accordance with this technique, both an "initial" and an "actual" set of bandwidth parameters are maintained and updated by the system. The initial set of bandwidth parameters are established when the system is first installed. As the system learns more about the actual bandwidth needs of a channel, it updates the initial values with the actual values to accurately reflect the actual bandwidth requirements of the channel. Thereafter, the actual values are updated periodically as dictated by the changing bandwidth requirements of the channel.

A number of embodiments of the present invention have been described. Nevertheless, it will be understood that various modifications may be made without departing from the spirit and scope of the invention. For example, although an exemplary wireless communication system is described, the present ATDD invention can be used in any communication system where an adaptive time division duplexing method is required or desired. Similarly, although the present invention can be used to adaptively allocate uplink/downlink bandwidths in a radio link, it can also be used to facilitate asymmetric bandwidth allocations in a stable (i.e., not dynamic) radio communication link. Similarly, the present invention is not limited by the time slot allocations described above. Virtually any number of time slot allocations (and thus, uplink/downlink bandwidth ratios) can be realized using the present ATDD invention. Further, the scope of the present invention is not limited to the exemplary bandwidth analysis technique described above. Rather, any technique which accurately monitors the bandwidth requirements of a communications link may be used with the present ATDD invention. Once the bandwidth requirements of a channel are determined, the present invention may be used to dynamically allocate the uplink/downlink time slots accordingly.

Accordingly, it is to be understood that the invention is not to be limited by the specific illustrated embodiment, but only by the scope of the appended claims.

The invention claimed is:

1. A method for adaptively duplexing transmissions in a communication link using a time division duplexing scheme wherein transmissions are communicated in an uplink direction during uplink time slots and wherein transmissions are communicated in a downlink direction during downlink time slots, the method comprising:
   predicting an initial uplink bandwidth requirement and an initial downlink bandwidth requirement of the communication link;
   calculating an initial uplink/downlink bandwidth requirement ratio for a frame based upon the initial uplink and initial downlink bandwidth requirements of the link;
   allocating initial uplink and downlink time slots in the frame in response to the calculated initial uplink/downlink bandwidth ratio;
   transmitting information during the initial uplink and downlink time slots;
   determining an actual uplink bandwidth requirement and an actual downlink bandwidth requirement based on the transmission during the initial uplink and downlink time slots;
   calculating an actual uplinik/downlink bandwidth requirement ratio based upon the actual uplink and actual downlink bandwidth requirements of the link;
   allocating actual uplink and downlink time slots in response to the calculated actual uplink/downlink bandwidth ratio; and
   transmitting information during the actual uplink and downlink time slots.

2. A method for adaptively duplexing transmissions between a base station and at least one CPE using a series of uplink and downlink frames of information in an adaptive time division duplexing scheme, wherein transmissions are communicated in an uplink direction during uplink time slots and wherein transmissions are communicated in a downlink direction during downlink time slots comprising:
   selecting a first service type for an uplink transmission;
   selecting a second service type for a downlink transmission;
   predicting an uplink bandwidth requirement that is associated with the selected first service type;
   predicting a downlink bandwidth requirement that is associated with the selected second service type;
   calculating an uplink/downlink bandwidth requirement ratio for a frame based upon the uplink and downlink bandwidth requirements;
   allocating uplink and downlink time slots in the frame in response to the calculated uplink/downlink bandwidth ratio; and
   periodically enabling uplink transmissions during the allocated uplink time slots and downlink transmissions during the allocated downlink time slots.

3. The method of claim 2, wherein the first service type is sensitive to transmission delays and the second service type is insensitive to transmission delays.

4. The method of claim 2, further comprising comparing sensitivities to a transmission delay for the first service type and the second service type.

5. The method of claim 4, further comprising shifting the uplinik/downlink bandwidth requirement ratio to reduce the transmission delay of the first service type at the expense of increasing the transmission delay of the second service type.

6. A method for adaptively duplexing transmissions in a communication link using a time division duplexing scheme wherein transmissions are communicated in an uplink direction during uplink time slots and wherein transmissions are communicated in a downlink direction during downlink time slots, the method comprising:
   selecting a quality of service associated with the communication link;
   predicting an initial uplink bandwidth requirement and an initial downlink bandwidth requirement of the communication link based on the selected quality of service;
   calculating an initial uplink/downlink bandwidth requirement ratio for a frame based upon the initial uplink and initial downlink bandwidth requirements of the link;
   allocating initial uplink and downlink time slots in the frame in response to the calculated initial uplink/downlink bandwidth ratio;
   transmitting information during the initial uplink and downlink time slots;
   determining an actual uplink bandwidth requirement and an actual downlink bandwidth requirement based on actual bandwidth utilization during the initial uplink and downlink time slots;
   calculating an actual uplink/downlink bandwidth requirement ratio based upon the actual uplink and actual downlink bandwidth requirements of the link;
   allocating actual uplink and downlink time slots in response to the calculated actual uplink/downlink bandwidth ratio; and
   transmitting information during the actual uplink and downlink time slots.

7. The method of claim 6, wherein the initial uplink bandwidth requirement and the initial downlink bandwidth requirement split the uplink time slots and the downlink time slots into equal portions.

8. The method of claim 6, wherein the initial uplink bandwidth requirement and the initial downlink bandwidth requirement split the uplink time slots and the downlink time slots into unequal portions.

9. The method of claim 8, further comprising calculating the actual uplink/downlink bandwidth requirement ratio based on the selected quality of service.

10. The method of claim 6, wherein the selected quality of service is based on type of service and data latency requirements.

* * * * *

UNITED STATES PATENT AND TRADEMARK OFFICE
CERTIFICATE OF CORRECTION

PATENT NO.         : 7,486,639 B2
APPLICATION NO.    : 11/114662
DATED              : February 3, 2009
INVENTOR(S)        : Stanwood et al.

Page 1 of 1

It is certified that error appears in the above-identified patent and that said Letters Patent is hereby corrected as shown below:

In Column 19, line 34, claim 1, kindly replace "uplinik" with --uplink--

In Column 20, line 11, claim 5, kindly replace "uplinik" with --uplink--

Signed and Sealed this

Thirtieth Day of June, 2009

JOHN DOLL
*Acting Director of the United States Patent and Trademark Office*